Nov. 10, 1936. A. GALBRAITH 2,060,007
FASTENER FOR FASTENING HOOK LINES TO TROT LINES
Filed Nov. 22, 1935
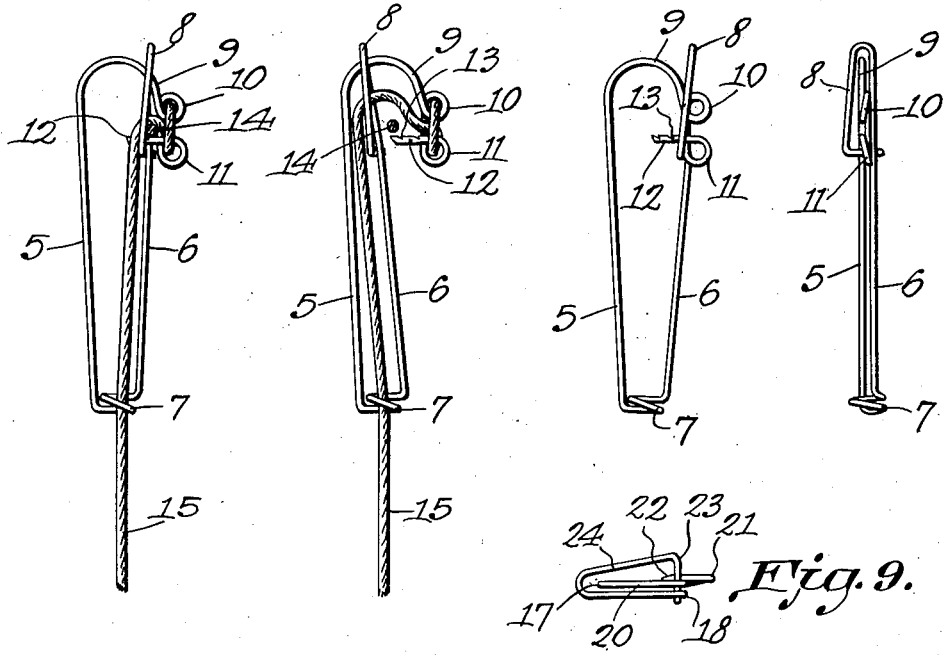
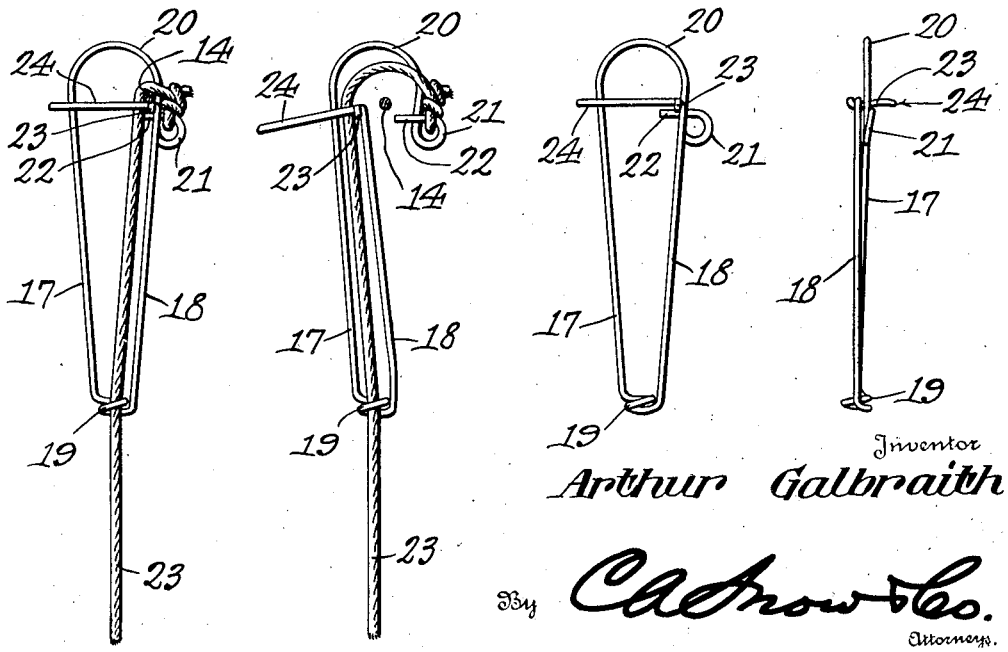
Inventor
Arthur Galbraith Patented Nov. 10, 1936

2,060,007

UNITED STATES PATENT OFFICE 2,060,007

FASTENER FOR FASTENING HOOK LINES TO TROT LINES

Arthur Galbraith, Ash Grove, Mo.

Application November 22, 1935, Serial No. 51,163

2 Claims. (Cl. 24—131)

This invention relates to fasteners, and more particularly to a fastener designed for securing fishing hooks with lines to a trot line, in such a manner that the hooks may be readily positioned and adjusted with respect to each other, longitudinally of the trot line.

An important object of the invention is to provide a fastener of this character which may be used for securing the fish hooks to a trot line, after the fish hooks have been baited, and the trot line has been properly positioned with respect to the surface of the water.

Another important object of the invention is to provide a fastener which will permit of adjustment of the fish hooks by the person using the trot line, but a fastener which will be securely held against movement longitudinally of the trot line, when a pull is directed to the hook secured to the trot line by the fastener, when a fish caught on the hook attempts to escape. A further object of the invention is to provide a fastener so constructed that a binding action will be set up between the trot line and hook carrying line secured to the fastener, when a pull is directed to the hook carrying line.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of a fastener constructed in accordance with the invention, and illustrating the fastener as secured to a trot line.

Figure 2 is an elevational view of the fastener, illustrating the position of the movable or clamping section of the fastener, while the fastener is being positioned over a trot line.

Figure 3 is a side elevational view of the fastener, the hook carrying line thereof having been removed.

Figure 4 is a view in elevation, illustrating one edge of the fastener.

Figure 5 is a side elevational view illustrating a modified form of fastener.

Figure 6 is an elevational view illustrating the position of the movable arm in this form of invention, while the fastener is being hooked over a trot line.

Figure 7 is a side elevational view of the modified form of fastener, the hook line having been removed.

Figure 8 is an elevational view illustrating one edge of the modified fastener.

Figure 9 is a plan view of the modified form of the fastener.

Referring to the drawing in detail, the fastener comprises a body portion constructed of a length of wire material bent upon itself providing arms 5 and 6, the arms 5 and 6 being connected by a loop portion 7 to add resiliency to the arms and increase the gripping action of the arms. The outer end of the arm 6 is bent rearwardly and laterally, providing an elongated eye 8 adapted to fit over the downwardly curved end portion 9 of the arm 5, as clearly shown by the drawing.

The downwardly curved end portion 9 of the arm 5 is formed into spaced eyes 10 and 11, the extremity of the end portion 9 being directed inwardly providing a finger 12 of a length to pass through the elongated eye 8. Formed along the upper edge of the finger 12, are teeth 13 which are adapted to bite into the trot line indicated at 14, and with which the fastener is used.

The fastener is designed for connecting the hook carrying line 15, to the trot line, the hook carrying line being threaded through the eye 10 and knotted, from where it is passed through the lower eye 11 and carried through the elongated eye 8, from where it is passed through the loop portion 7 at the lower end of the fastener.

When the fastener is to be applied to a trot line, the arm 6 is moved towards the arm 5 in a manner as shown by Figure 2 of the drawing, whereupon the downwardly curved end portion 9 may be hooked over the trot line. The arm 6 is now released and the arm grips the trot line 14. It will be obvious that a pull on the hook carrying line 15, will set up a binding action causing the trot line to be firmly gripped by the fastener, preventing movement of the fastener longitudinally of the trot line by a fish pulling on the line 15.

In the form of the invention as shown by Figures 5 and 6 of the drawing, the body portion is also formed by bending a length of resilient wire material intermediate its ends, providing arms 17 and 18, connected by a loop 19.

The curved end 20 of the arm 17 has its extremity formed into an eye 21, the free end thereof extending inwardly and providing a finger 22 over which the bar 23 of the elongated eye 24 moves.

This eye 24 is formed at the free end of the arm 18, and extends at right angles with respect to the arm.

In securing the hook as shown in this form of the invention, the curved end 20 of the arm 17 is hooked over the trot line 14, whereupon the arm 18 is released. The hook carrying line 23 will now overlie the trot line 14 and will act to bind the trot line and prevent movement of the hook when a pull is directed to the line 23 by a fish attempting to escape.

Having thus described the invention, what is claimed is:

1. A fastener of the class described, comprising a pair of resilient arms, an elongated eye formed at the free end of one of the arms, the free end of the opposite arm being curved and provided with spaced eyes, the extremity of the last mentioned arm being extended through the elongated eye at right angles to the arms and providing a finger, said curved end engaging one of the eyes restricting movement of the arms with respect to each other, and said elongated eye and finger adapted to cooperate in gripping an article.

2. A fastener comprising resilient arms, one of the arms having an elongated eye, one end of the opposite arm being curved and providing spaced eyes, the extremity of the last mentioned arm extending through the elongated eye, one of the spaced eyes contacting with the elongated eye, restricting movement of the arms with respect to each other, and said extremity of the arm extended through the elongated eye, adapted to cooperate with the elongated eye in gripping an article therebetween.

ARTHUR GALBRAITH.